Figure 1:
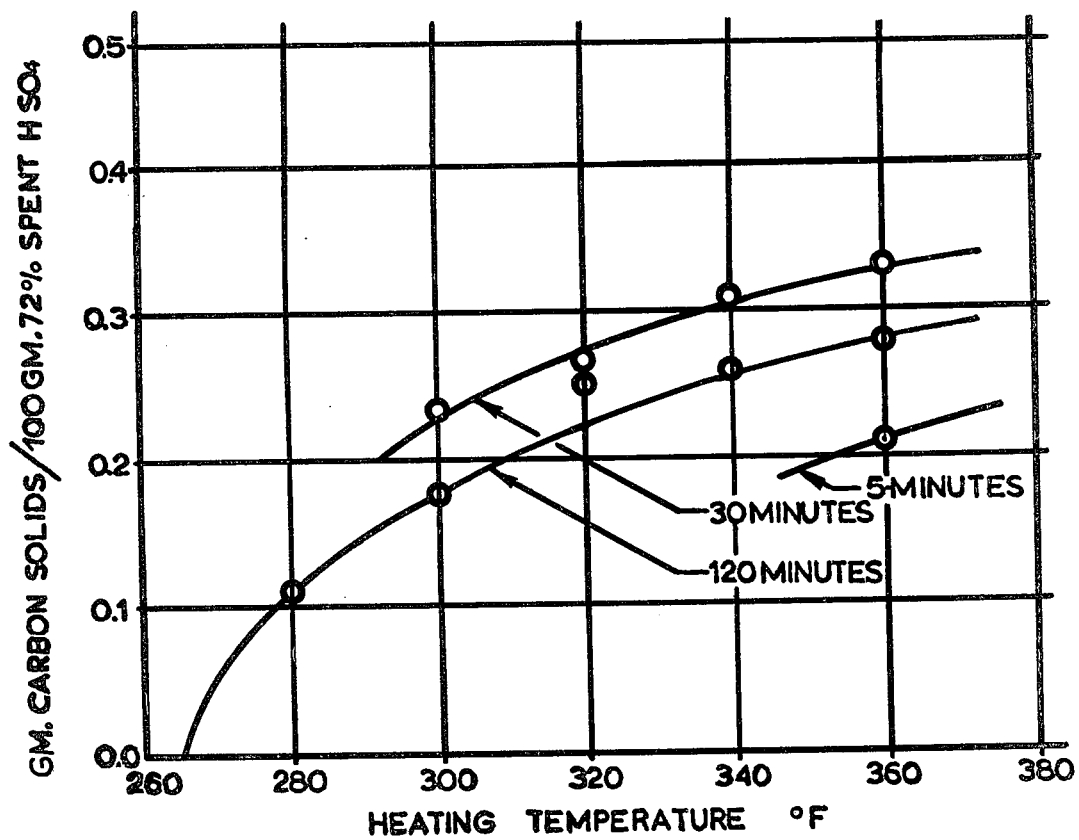

United States Patent [19]

Petersen

[11] 4,001,383
[45] Jan. 4, 1977

[54] IMPURE SULFURIC ACID TREATMENT PROCESS

[75] Inventor: Alfred W. Petersen, Salt Lake City, Utah

[73] Assignee: Stauffer Chemical Company, Westport, Conn.

[22] Filed: July 25, 1975

[21] Appl. No.: 599,231

Related U.S. Application Data

[60] Continuation of Ser. No. 171,365, Aug. 12, 1971, abandoned, which is a division of Ser. No. 812,124, April 1, 1969, abandoned.

[52] U.S. Cl. .............................. 423/531; 423/528; 423/320
[51] Int. Cl.² ................. C01B 17/90; C01B 17/72; C01B 25/16
[58] Field of Search .......... 423/528, 529, 531, 320

[56] References Cited
UNITED STATES PATENTS

| | | | |
|---|---|---|---|
| 2,067,985 | 1/1937 | Sargent | 423/531 |
| 2,345,506 | 3/1934 | Slotterbeck | 423/528 |
| 2,799,557 | 7/1957 | Seyfried et al. | 423/320 X |
| 2,992,070 | 7/1961 | Henley | 423/528 |

*Primary Examiner*—Earl C. Thomas
*Assistant Examiner*—Gregory A. Heller
*Attorney, Agent, or Firm*—Edwin H. Baker

[57] ABSTRACT

A process for thermally-degrading the thermally-degradable organic matter contained in spent sulfuric acid by condensing steam in the spent acid for a time sufficient to degrade the thermally-degradable organic matter, the steam being at a pressure exceeding the vapor pressure of said spent acid. Treated sulfuric acid is useful in the production of wet process phosphoric acid by a novel process. Spent sulfuric acid containing non-degradable organic matter can be used in a mixture with the treated sulfuric acid.

2 Claims, 3 Drawing Figures

SPENT SULFURIC ACID HEAT TREATMENT

IMPURE SULFURIC ACID TREATMENT PROCESS

This is a continuation of application Ser. No. 171,365, filed Aug. 12, 1971, now abandoned which is a division of then pending application Ser. No. 812,124, filed Apr. 1, 1969, now abandoned.

This invention relates to a process for rendering impure sulfuric acid suitable for industrial uses. More particularly, this invention relates to a novel process for heat treating sulfuric acid containing thermally-degradable organic matter in order to decompose said organic matter. Such treated sulfuric acid is suitable for use in wet process phosphoric acid manufacture or other industrial process wherein the non-degraded organic matter is undesirable.

Sulfuric acid that is used in numerous organic chemical processes often absorbs water and/or organic matter. Sulfuric acid that has absorbed too much water and/or organic matter for further use in said organic chemical processes is called "spent" sulfuric acid. Spent sulfuric acids that are high in organic matter and low in water are usually burned with sulfur and reconverted to pure sulfuric acid. The organic matter provides fuel value in the burning process. The low water content does not require a large vaporization heat input. However, spent sulfuric acids that are high in water and low in organic matter are costly to burn with sulfur due to the large amount of heat required to vaporize the water. It is more economical to use these acids in other processes, such as the manufacture of wet process phosphoric acid, the manufacture of granular fertilizers, or other industrial processes.

Wet process phosphoric acid is produced by sulfuric acid acidulation of phosphate rock. The process involves the steps of (1) dissolving phosphate rock in sulfuric acid, (2) holding the acidulate slurry until the calcium sulfate crystals grow to adequate size, (3) separating the acid and calcium sulfate by filtration, and (4) concentrating the acid to the desired level. The reaction for the process used most extensively is as follows:

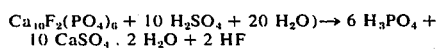

$$Ca_{10}F_2(PO_4)_6 + 10\ H_2SO_4 + 20\ H_2O \rightarrow 6\ H_3PO_4 + 10\ CaSO_4 \cdot 2\ H_2O + 2\ HF$$

In industrial practice the acidulation reaction mixture comprises a slurry of gypsum and other solid impurities in the dilute phosphoric acid product. The gypsum and other solids are separated, usually by filtration, and the dilute acid product concentrated. Reference is made to *Kirk-Othmer Encyclopedia of Chemical Technology*, 2nd Edition, Vol. 9, pages 86–95 for a more comprehensive description of wet process phosphoric acid production.

A preferred use for the aforediscussed high water low organic spent sulfuric acids is in the manufacture of wet process phosphoric acid. The high water content is not a disadvantage, since the sulfuric acid concentration can be as low as 55% by weight $H_2SO_4$ in the feed to the wet process. The sulfuric acid demand of the wet process is normally large and continuous, thereby consuming large quantities of spent sulfuric acid.

It is well-known by those skilled in the art that some types of high-water spent sulfuric acid can be used as is in the production of wet process phosphoric acid, while other types cause processing problems due to the nature of the specific organic impurities. Increased foaming, poor gypsum crystal growth, and poor filtration of the phosphoric acid-gypsum slurry are typical problems.

It is also known by those skilled in the art that heating some types of spent sulfuric acid to a sufficiently high temperature will degrade the organic matter to solid carbon and often liberate gases such as sulfur dioxide and water as reaction byproduct. It is known that such can be performed through a heat transfer surface with well-known heat sources such as condensing steam, Dowtherm, electrical resistance, and others. It is also known that heating can be performed by blowing hot air or hot combustion gases through the spent sulfuric acid.

Spent sulfuric acid treated by said heating methods causes much less foam and grows larger faster-filtering gypsum crystals in the phosphoric acid wet process than untreated spent sulfuric acid. However, the carbon product of the organic degradation is in the form of very small particles and these small particles blind the gypsum filter cake in the phosphoric acid wet process, thereby slowing the filtration rate and causing high phosphoric acid loss.

A disadvantage of the prior art heating processes, i.e., where a heat transfer surface is used, is that the materials required to avoid substantial corrosion are very costly. Such material is tantalum, which is the best material for a heat transfer surface at the conditions required to decompose most organic matter. Glass, Duriron, Teflon, and Karbate, resist corrosion, however, they have serious limitations. One of them being that they are limited in operating pressure due to brittleness. Teflon is also a poor heat conductor, and the operating pressure is limited.

A disadvantage of the prior art heating process where hot air or hot combustion gas is used, is that the atmospheric boiling point of the high-water spent sulfuric acid maybe less than the required temperature to obtain decomposition of the organic matter. Decomposition must be obtained by supplying costly heat to boil the acid until the boiling point rises to the required decomposition temperature.

It is an object of this invention to provide a novel and economical process for heat treating spent sulfuric acid.

It is another object of this invention to provide a process to utilize heat treated spent sulfuric acid containing carbon solids in the efficient production of wet process phosphoric acid.

It is yet another object of this invention to provide a process for the use of unheated spent sulfuric acid containing nondegradable organic matter in combination with heated treated spent sulfuric acid that had contained thermally-degradable organic matter in the efficient production of wet process phosphoric acid.

As to one embodiment of the present invention, it has been discovered that spent sulfuric acid containing thermally-degradable organic matter can be used in the production of wet phosphoric acid provided that a flocculating agent is added to the phosphoric acid-gypsum before filtration. Preferably, the spent acid is heated to between about 260° F. and about 500° F., more preferably, between about 280° F. and about 360° F. for at least 2 minutes. The heating degrades the thermally-degradable organic matter that interferes with gypsum crystallization. The flocculating agent agglomerates the small carbon particles from the organic degradation, thereby increasing filtration rate.

Also quite unexpectedly in some cases, the use of the flocculating agent increases the filtration rate to a rate as high as that obtainable with pure sulfuric acid. As previously stated, heat treating the spent sulfuric acid decomposes the organic matter contained therein to carbon. Decreasing of the original organic matter in the spent sulfuric acid prevents foaming of the reaction of sulfuric acid and phosphoric rock, and eliminates or reduces the use of a defoamer.

The flocculating agent can be any of a class of anionic, cationic, or nonionic long-chain organic polymers with a molecular weight between about 50,000 and about 20,000,000. These flocculating agents are well-known to those skilled in the art. Generally about 0.01 to 0.2 pounds of flocculating agent per ton of solids being filtered give the desired results. Preferably around 0.014 pounds of flocculating agent per ton of solids being filtered gives optimum results.

In another embodiment of the present invention, it has been discovered that the heat treating the spent acid containing the thermally-degradable organic matter can be performed by a novel and economical process which comprises bubbling low pressure steam into the spent sulfuric acid at subatmospheric, atmospheric, or superatmospheric pressure. The steam condenses directly in the spent acid, thereby liberating the heat of condensation. The condensed steam also dilutes the acid, thereby liberating heat of dilution. Said heat of condensation and heat of dilution increase the temperature of the acid. Quite surprisingly, the temperature of the spent acid can increase substantially above the temperature of the steam, thereby allowing low pressure steam to be used to heat the sulfuric acid to the required high temperature.

The pressure of steam must exceed the vapor pressure of the spent acid and can be between about 5 PSI absolute and about 600 PSI absolute. The temperature of the steam is not required to exceed the temperature of the spent acid. The steam can be wet or saturated or superheated. If the vapor pressure of the spent sulfuric acid at the required heating temperture is above atmospheric pressure, the spent acid can be pressurized to prevent boiling.

It the vapor pressure of the spent acid at the required heating temperature is higher than convenient, the vapor pressure may be lowered by mixing the spent acid with oleum or a more concentrated sulfuric acid before heating.

One advantage of the heating process of this invention over prior art heating processes, is that expensive metal heat transfer surface is not required. Another advantage is that high pressure steam is not required. Yet another advantage is that water need not be evaporated to obtain a sufficiently high atmospheric boiling point.

In another embodiment of the present invention, it has been discovered that spent sulfuric acid containing nondegradable organic matter can be used in combination with heat treated spent sulfuric acid that had contained thermally-degradable organic matter in the process for the production of wet process phosphoric acid as previously described herein as the first embodiment of the present invention. It has been found that the solid carbon product of the degradation becomes activated and can absorb organic matter in a manner similar to commercial activated carbon. The activated carbon degradation product absorbs part of the organic matter from the unheated spent acid, thereby reducing foaming and reducing the formation of slow-filtering gypsum crystals. The activated carbon also absorbs part of the organic impurities normally incident in phosphate rock and, therefore, foaming due to said organic impurities is decreased. Generally, the ratio of heat treated spent sulfuric acid to non-heat treated spent sulfuric acid can be between about 10:90 to about 90:10 percent by weight.

The following examples illustrate the present invention:

EXAMPLE I

A sample of spent sulfuric acid by-product from an ethanol manufacturing process was filtered to remove 1.73 gm. carbon solids 100 gm. 72.2% by weight spent $H_2SO_4$. The filtered spent acid containing 72.2% by weight $H_2SO_4$ was divided into 100 gm. samples. The atmospheric boiling temperature was 333° F. Each sample was mixed with 73.7 gm. of pure 98% by weight $H_2SO_4$ in order to increase the atmospheric boiling temperature to 407° F. The mixtures containing 83.2% by weight $H_2SO_4$ were heated at various temperatures for different times. Black carbon solids were formed during the heating. At the end of the heating period, the sample was cooled, diluted to 40% by weight $H_2SO_4$, and filtered. The solids obtained are given in FIG. 1 of the drawings as the gm. carbon solids/100 gm. spent 72.2% by weight $H_2SO_4$. The data show that degradation of organic matter to carbon occurs as low as 265° F. and that a heating time of at least two minutes is required. This example also shows how mixing in a more concentrated sulfuric acid increases the boiling temperature.

EXAMPLE II

The same acid mixture of Example I was heated to 360° F. for various times at atmospheric pressure. The gas evolved from the heating was passed through a caustic absorber and analyzed for $SO_2$. The quantity of $SO_2$ evolved is given in Table 1.

Table 1

| Heating Time Minutes | $SO_2$ Evolution, gm. $SO_2$ 100 gm. Spent Acid 72.2% $H_2SO_4$ by weight |
|---|---|
| 8 | 1.1 |
| 23 | 2.0 |
| 38 | 2.3 |
| 60 | 2.8 |

This example shows that $SO_2$ evolution accompanied carbon formation in the thermal degradation of organic matter in $H_2SO_4$.

EXAMPLE III

Filtration rate tests were run with 538 gm. samples of typical wet process phosphoric acid-gypsum slurry containing 40% by weight gypsum solids and 60% by weight phosphoric acid analyzing 30% by weight $P_2O_5$. The tests were run at 150° F. and 8.1 PSI vacuum on a 62 sq. cm. Saran filter cloth.

Figure 2:
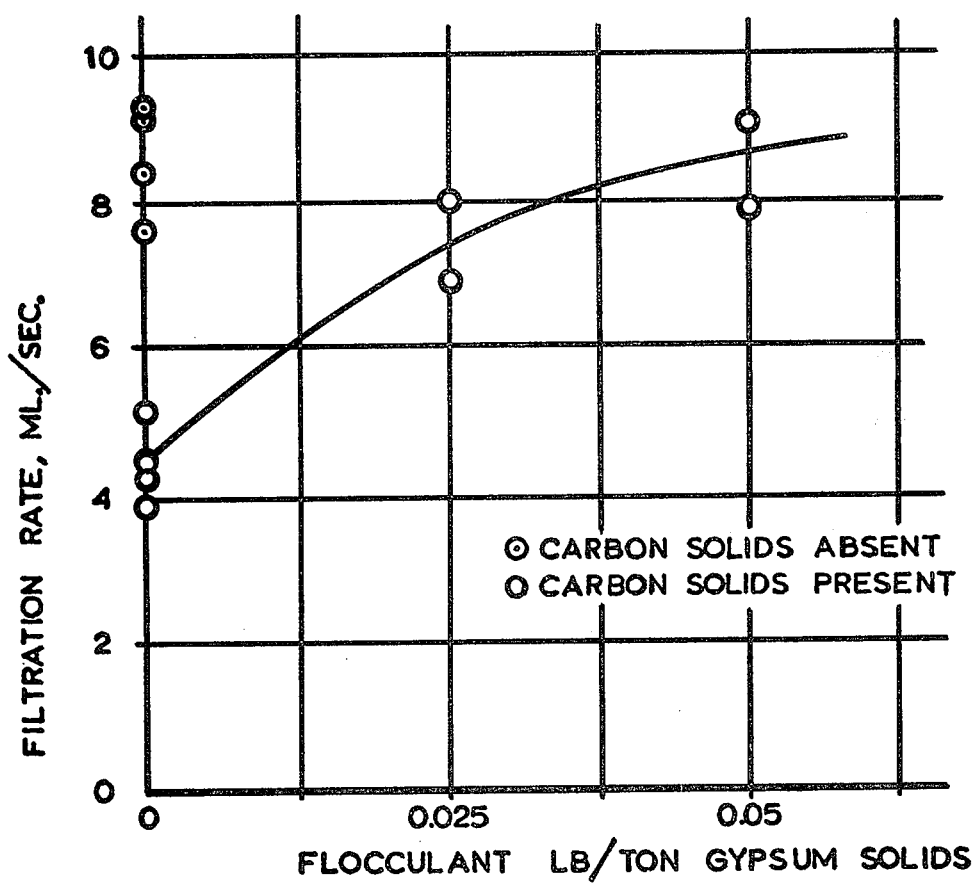

The time and volume of filtrate required to give the cake a dry appearance were used to calculate the filtration rate. To each sample, except the blanks, were added the filtered and water-washed carbon solids from 83 grams of spent sulfuric acid from an ethanol process. The spent acid contained 71.0% by weight $H_2SO_4$ and 1.41 gm. of carbon solids (dry weight). The quantity of spent acid used is equivalent to producing wet process phosphoric acid slurry from phosphate rock with equal amounts of $H_2SO_4$ from spent acid and from pure acid. To each sample was added, immediately before filtering, 10 ml. of water containing various amounts of a flocculant as heretofore described. The results of the tests are given in FIG. 2 of the drawings and show that the carbon solids greatly decrease filtration rate in the absence of flocculant. The flocculant addition increased the filtration rate without carbon solids.

EXAMPLE IV

Steam was generated at 13 PSI absolute and 206° F. The steam was bubbled through 100 gm. of pure 98% by weight $H_2SO_4$ initially at a temperature of 75° F. The temperature increased rapidly and reached a maximum temperature of 390° F. at which point the acid contained 81% by weight $H_2SO_4$ and had a vapor pressure of 13 PSI absolute. Additional steam flow lowered the temperature and concentration but the vapor pressure remained equal to the steam pressure. This example shows that the sulfuric acid is heated to a higher temperature than the steam by direct contact of steam and acid and that the vapor pressure of the sulfuric acid is heated to a higher temperature than the steam by direct contact of steam and acid and that the vapor pressure of the sulfuric acid does not exceed the steam pressure.

EXAMPLE V

Figure 3:
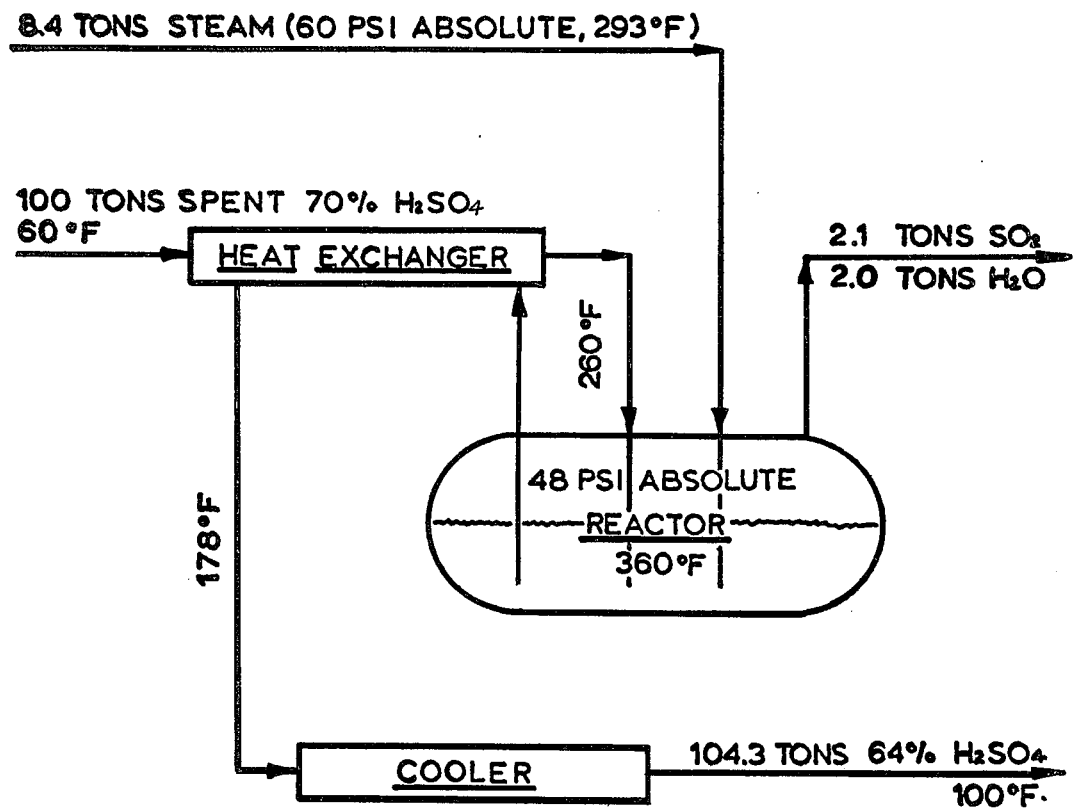

A typical heat and material balance for spent sulfuric acid heat treatment above atmospheric pressure is given in FIG. 3 of the drawings. Spent sulfuric acid containing 70% by weight $H_2SO_4$ was fed through a heat exchanger 11 in order to recover heat from the heat-treated product. Steam is bubbled through the spent sulfuric acid thereby heating the acid to a higher temperature than the steam temperature. The pressure is controlled above atmospheric pressure in order to prevent boiling at 360° F. The $SO_2$ gas formed is bled off accompanied by water vapor at the rate necessary to maintain the required pressure. This example shows that a high temperature can be obtained without a high temperature heat transfer surface. The intermediate temperature heat exchanger may be used to decrease steam consumption but is not an essential part of the invention.

EXAMPLE VI

Wet process phosphoric acid was produced in plant scale tests to compare acidulation by the following combinations of sulfuric acid:
(1) Pure sulfuric acid; (2) ½ $H_2SO_4$ pure, and ½ $H_2SO_4$ unheat treated spent; (3) ½ $H_2SO_4$ pure and ½ $H_2SO_4$ heat treated spent. The pure $H_2SO_4$ contained 99% by weight $H_2SO_4$. The unheat treated spent $H_2SO_4$ from an ethanol process contained 70% by weight $H_2SO_4$ and 2.4 lb. carbon solids (dry weight) per 100 lb. $H_2SO_4$. The heat treated spent $H_2SO_4$ from the same ethanol process, had been concentrated by submerged combustion heating at over 340° F. and contained 90% by weight $H_2SO_4$ and 2.8 lb. carbon solids (dry weight) per 100 lb. $H_2SO_4$. The data obtained in the plant runs at the same $P_2O_5$ production rate are given in Table 2. The data show for the unheat treated spent acid a high soluble loss and high flocculant consumption, which are indications of poor gypsum filtration. The heat treated spent reduced the soluble $P_2O_5$ loss. The unheat treated spent acid required less defoamer consumption, while the heated spent acid required less defoamer than the pure sulfuric acid.

Table 2

|  | Pure sulfuric Acid | Unheated Spent Sulfuric Acid (1) | Heated Spent Sulfuric Acid (1) |
| --- | --- | --- | --- |
| Phosphoric Acid Rate, tons $P_2O_5$/day | 180 | 180 | 180 |
| Insoluble $P_2O_5$ Loss, percent | 2.9 | 3.3 | 3.3 |
| Soluble $P_2O_5$ Loss, percent | 1.8 | 2.4 | 1.7 |
| Defoamer lb./ton $P_2O_5$ | 9 | 18 | 7 |
| Flocculant (2) lb./ton $P_2O_5$ | 0 | 0.3 | 0.2 |

(1) 1/2 pure $H_2SO_4$ & 1/2 spent $H_2SO_4$
(2) Separan MGL a white, free flowing, amorphous polyacrylomide of the formula

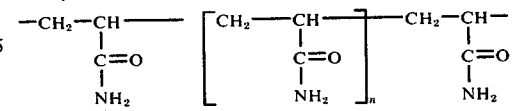

and having a nominal M.W. of $1 \times 10^6$ with 0–5% of the $-NH_2$ groups hydrolyzed with $-ON_a$ groups.

EXAMPLE VII

A sample of spent sulfuric acid from an ethanol process containing degradable organic matter was heated to 360° F. for 30 minutes. After the heating, 131.7 gm. of the heat treated spent acid containing 100 gm. $H_2SO_4$ and 2.79 gm. carbon solids was mixed with 124.8 gm. of spent sulfuric acid from a DDT (dichloro diphenyl trichloroethane) process containing 100 gm. $H_2SO_4$ and nondegradable soluble-organic matter. Thus, 50% of the $H_2SO_4$ was from heat treated spent $H_2SO_4$ was from spent $H_2SO_4$ from a DDT process. The acid mixture was used to acidulate 257 gm. phosphate rock containing 31% by weight $P_2O_5$ and soluble organic matter in order to make phosphoric acid containing 30% by weight $P_2O_5$.

The acidulation was repeated with other combinations of spent sulfuric acids as shown in Table 3. Foam tests were run by bubbling 84 ml./min. air through 100 ml. of the phosphoric acid samples at 150° F. in a 250 ml. graduated cylinder. The percent by volume of steady foam obtained is given in Table 3. The data show that the organics in the rock cause some foam, but the spent sulfuric acid from the DDT process causes more foam. The heat treated spent sulfuric acid from the ethanol process decreases the foam to less than obtained with pure sulfuric acid, since soluble-organic matter from both the rock and the spent sulfuric acid from the DDT process is absorbed by the carbon solids.

Table 3

| Phosphoric Acid Source | | Percent By Volume Foam |
| --- | --- | --- |
| (a) | 100% $H_2SO_4$ pure | 30 |
| (b) | 100% $H_2SO_4$ spent from DDT process | 100 |
| (c) | 50% $H_2SO_4$ pure & 50% $H_2SO_4$ spent from DDT process | 65 |

Table 3-continued

| Phosphoric Acid Source | Percent By Volume Foam |
|---|---|
| (d) 50% $H_2SO_4$ spent heat treated from ethanol process & 50% $H_2SO_4$ spent from DDT process | 5 |

What is claimed:

1. A process for removing non-degradable organic matter in spent sulfuric acid comprising mixing about 90:10 percent by weight of said acid with about 10:90 percent by weight of spent sulfuric acid containing carbon formed by thermally-degraded organic matter.

2. The process of claim 1 including the additional step of mixing the mixed acids with phosphate rock to acidulate the phosphate rock in a wet process phosphoric acid process to produce phosphoric acid and gypsum.

* * * * *